United States Patent [19]

Mills

[11] 3,768,741
[45] Oct. 30, 1973

[54] FOOD GRINDER
[76] Inventor: Archie W. Mills, 2941 S. Michigan Ave., Chicago, Ill. 60616
[22] Filed: Aug. 4, 1971
[21] Appl. No.: 169,008

[52] U.S. Cl. .............................................. 241/82.1
[51] Int. Cl. .......................................... B02c 18/30
[58] Field of Search ................ 146/182 B, 182, 185, 146/186, 187, 188, 189 R, 190, 260; 241/82.1, 82.2, 82.3, 82.4, 82.5, 82.6, 82.7

[56] References Cited
UNITED STATES PATENTS
| 2,030,758 | 2/1936 | Naturkacz | 146/182 B |
| 1,600,123 | 9/1926 | Milici et al | 146/186 X |
| 403,022 | 5/1899 | Albrecht | 146/185 |

FOREIGN PATENTS OR APPLICATIONS
| 395,944 | 5/1924 | Germany | 146/182 B |
| 339,075 | 7/1921 | Germany | 146/182 B |
| 412,975 | 3/1946 | Italy | 146/185 |

Assistant Examiner—Z. R. Bilinsky
Attorney—Carlton Hill et al.

[57] ABSTRACT

This invention provides an improvement in a food grinder including a hopper in the upper portion of the housing of the grinder and a worm feed screw rotatably mounted in the lower portion of the housing and communicating with the hopper and a perforated plate mounted on the front end of the housing. The improvement comprises: a spring-biased force member mounted on the housing adjacent to the worm feed screw, the force member being moveable toward and away from the periphery of the feed screw to alternately provide a food receiving pocket alongside the feed screw and to close this pocket; and a cam mounted on the feed screw and arranged to actuate the force member whereby when food is fed into the hopper and the feed screw is rotated to drive the food to the perforated plate, the force member pushes the food from the pocket into the feed screw to maintain the movement of the food to the perforated plate.

3 Claims, 7 Drawing Figures

PATENTED OCT 30 1973 3,768,741
SHEET 1 OF 2
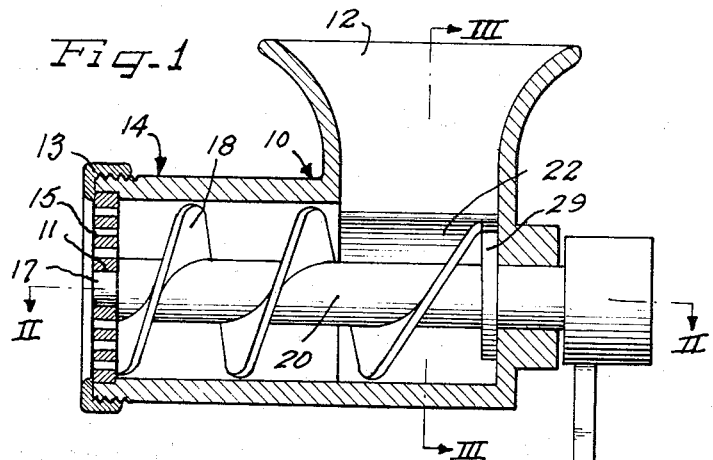
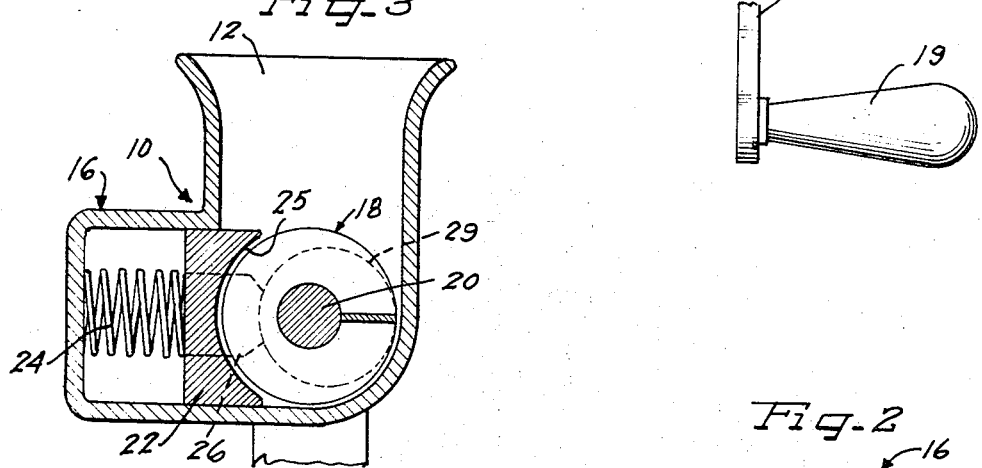
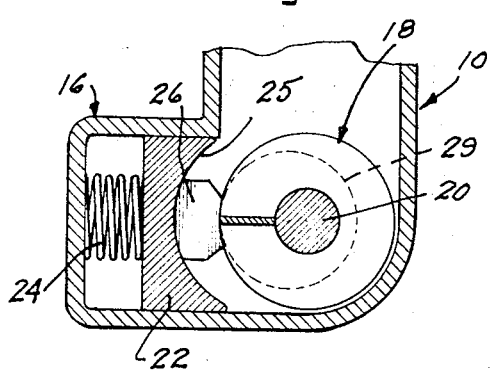
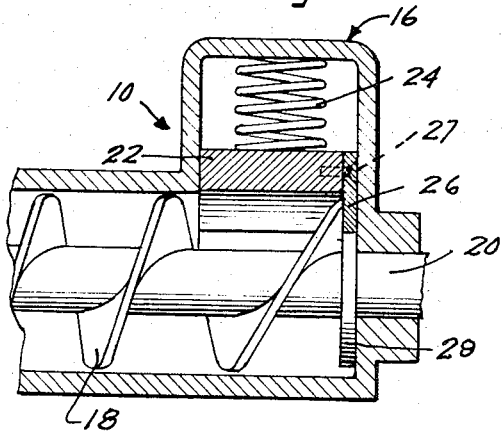
INVENTOR.
Archie W. Mills
BY Hill, Sherman, Meroni, Gross & Simpson ATTORNEYS

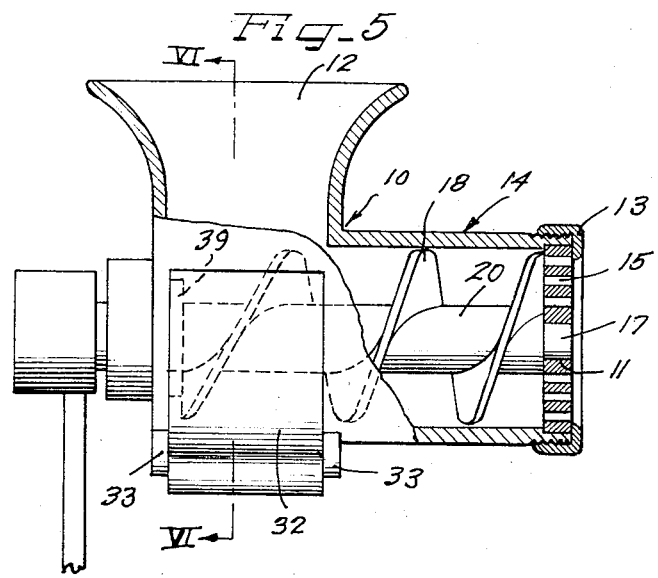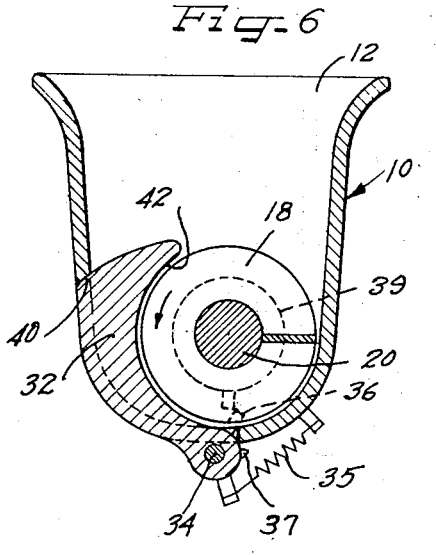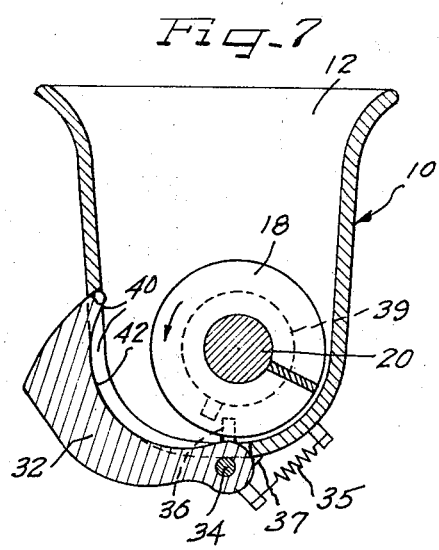

FOOD GRINDER

BACKGROUND OF THE INVENTION

This invention relates to food grinders employing a feed screw and used, for instance, in a meat market for grinding meats.

There are various types of food grinders including many of the meat grinders that are operated by hand or motor driven which are used, for example, in homes, grocery stores, and meat markets. In many of these food grinders, the food placed therein must be pressed downward towards the feed screw by hand or by means of a block placed in the hopper of the grinder with pressure applied to the block to maintain its position in the hopper during the grinding operation. Also, in many of these grinders, there is an accumulation of food in between the feed screw and a wall of the housing of the grinder. This accumulation of food or at least a part thereof, is generally not processed through the grinder and can clog the grinder to impair or stop its normal operation. Moreover, the accumulation of food in a grinder is not prevented by merely passing the food down toward the feed screw either by hand or by placing a block in the hopper of the grinder because the food can still accumulate in between the feed screw and a wall of the grinder.

Because of the disadvantages of the present food grinders, there is a need for a grinder where food can be fed into a hopper and processed without any accumulation, through the grinder.

SUMMARY OF THE INVENTION

Accordingly, I have provided an improved food grinder in which food can be fed, processed and ground without any accumulation of food therein. The improvement is provided in a food grinder of the type having a hopper in the upper portion of the housing of the grinder and a worm feed screw rotatably mounted in the lower portion of the housing and in communication with the hopper and a perforated place mounted on the front end of the housing. The improvement comprises: a spring-biased force member mounted on said housing adjacent to the feed screw, the force member being moveable toward and away from the periphery of the feed screw to alternately provide a food receiving pocket alongisde the feed screw and to clos this pocket; and a cam mounted on the feed screw and arranged to actuate the force member whereby when food is fed into the hopper and the feed screw is rotated to drive the food to the perforated plate, the force member pushes the food from the pocket into the feed screw to maintain the movement of the food to the perforated plate.

Therefore, it is an object of the present invention to provide a food grinder wherein food is ground and processed through the grinder without any accumulation.

Other objects, features, and advantages of the invention will be readily apparent from the following description of the preferred embodiments thereof, taken in conjunction with the accompanying drawings, although variations and modifications may be effected without departing from the spirit and scope of the novel concepts of the disclosure.

BRIEF DESCRIPTION OF THE DRAWINGS

FIG. 1 is a side elevational view, partially in section, of a food grinder embodying the present invention;

FIG. 2 is a partial sectional view taken on line II—II of FIG. 1, illustrating the association of the force member with the worm feed screw of the food grinder;

FIG. 3 is a sectional view taken on line III—III of FIG. 1, illustrating the worm feed screw rotated in a position with the force member advanced toward the periphery thereof;

FIG. 4 is a sectional view similar to that of FIG. 3, illustrating the worm feed screw rotated in another position with the force member retracted from the periphery of the worm feed screw;

FIG. 5 is a side elevational view, partially in section, of another embodiment of the food grinder of the present invention;

FIG. 6 is a sectional view taken on line VI—VI of FIG. 5, illustrating the worm feed screw rotated in one position with the force member advanced toward the periphery thereof; and FIG. 7 is a sectional view similar to that of FIG. 6, illustrating the worm feed screw rotated in another position with the force member retracted from the periphery of the worm feed screw.

DETAILED DESCRIPTION OF THE PREFERRED EMBODIMENTS

FIGS. 1 through 4 illustrate a food grinder embodying the present invention. Referring to FIG. 1, the food grinder has a housing 10 which includes in its upper portion a hopper 12. In the lower portion of the housing 10 there is rotatably mounted a worm feed screw 18 which is turned by a handle 19 connected by an arm 21 to the shaft 20 of the feed screw 18. As shown, the feed screw communicates directly with the hopper 12 and a perforated plate 15 mounted by clamps 13 on the front end section 14 of the housing. The shaft 20 is arranged to rotate in the plate 15 by means of its front end 17 being journaled in a center opening 11 of the plate 15.

As shown in FIGS. 2 to 4, the housing 10 includes a side section 16 in which a force member or block 22 is mounted on a spring 24. The spring 24 biases the force member 22 toward the feed screw 18. Referring particularly to FIGS. 3 and 4, the block 22 has an inner arcuate surface 25 which faces the feed screw 18 and is arranged to advance toward and away from the periphery of the feed screw.

As shown in FIG. 1, and illustrated in detail in FIGS. 3 and 4, a cam 29 is mounted on the shaft 20 of the feed screw 18 and arranged toward the rear end of the shaft 20. Secured to the block 22 by means of bolt 27, is a cam follower 26 or the means by which the cam 29 actuates the force member toward and away from the feed screw 18. Thus, when food is fed into the hopper 12 and descends onto the rotating feed screw 18 and the force block 22 is spaced away from the feed screw, some food will accumulate in the space between the block and feed screw. The block 22 then pushes the food into the feed screw 18 to maintain the forward movement of the food in the grinder and out through the perforated plate 15. Accumulations of the food around the screw is avoided and the "gulping" action obtained through the alternate creation of a food receiving pocket and the pushing of food from this pocket to the screw increases the capacity of the grinder.

Another embodiment of the present food grinder is illustrated in FIGS. 5 to 7. The construction of this embodiment is similar to that of the embodiment described above except for the arrangement of the force member and the structure of the acuating cam.

This embodiment of the food grinder, as shown in FIG. 5, has a housing 10 in which is included a hopper 12, a worm feed screw 18 and a perforated plate 15 mounted on the front end 14 of the housing. This embodiment includes a force member or block 32 pivotally mounted at its lower end on the outside of the housing 10 by means of hinges 33 and a pin 34 running through the block 32 on the hinges.

As shown in FIGS. 6 and 7, the force member 32, is arranged within an opening 40 of the housing 10 adjacent to the worm feed screw 18, and by means of a spring 35 is biased away from the feed screw 18. A protruding member 37 is provided on the force member 32 to limit its movement away from the feed screw and to maintain the force member 32 in the opening 40 of the housing, as illustrated in FIG. 7. The force block 32 has an inner arcuate surface 42 which faces the feed screw 18 and is arranged to advance toward and away from the periphery of the feed screw when the force member is acuated toward the feed screw by a cam 39. The cam 39 is mounted on the shaft 20 of the feed screw 18 and acuates the force member 32 toward the feed screw by means of a cam follower 36 secured to the lower end of the force member 32. The cam 39, mounted at the rear end of the shaft 20, is arranged to acuate the force member 32 toward the feed screw 18 for a small portion of the rotation of the feed screw. Thus, the block member 32, as illustrated in FIG. 7, is in an opened and retracted position during most of the grinding operation to form a food receiving pocket. Accordingly, when the force member is actuated toward the feed screw, the force member pushes the food from this pocket into the screw to maintain the forward movement of the food in the grinder to the perforated plate.

In the operation of both embodiments of the food grinder, food is fed into the hopper 12, and descends onto the feed screw with some falling into the space between the force member and feed screw which is formed when the force member is retracted. Then, by rotating the feed screw in a clockwise manner the force member is actuated by the cam toward the feed screw and pushes the food from this space to the feed screw to maintain the movement thereof through the grinder and out the perforated plate 15. With this arrangement, the forward movement of the food is maintained through the grinder without any accumulation.

It is noted, although both embodiments of the food grinder have been shown to be manually operated by a means of a handle 19, the grinder can be motor driven by mounting a motor device onto the rear end of the shaft 20 to rotate the feed screw 18. Accordingly, the operation of the grinder will be continuous.

Although minor modifications might be suggested by those versed in the art, it is to be understood that I wish to embody within the scope of the present patent warrented hereon all such modifications as reasonably and properly come within the scope of my contribution to the art as defined in the appended claims.

I claim:

1. A food grinder comprising --
   A. a housing enclosing a generally cylindrical channel whose length is greater than its diameter, said housing defining at one end of said channel a shaft bore and at the other end thereof an aperture,
   B. a hopper associated with said housing whose mouth is adapted to open upwardly when said channel is horizontal and whose base radially interconnects with said channel adjacent one end thereof,
   C. a perforated plate demountably secured across said aperture,
   D. a feed screw in said channel and generally coaxial therewith, said screw having a flight portion and a shaft portion, said flight portion having a diameter approaching that of said channel, said shaft portion being journaled at opposite ends thereof in said perforated plate and in said shaft bore, respectively,
   E. drive means for said feed screw located exteriorly of said housing and connected with said shaft portion adjacent said shaft bore, and adapted to rotate said feed screw,
   F. a cam disc in said channel mounted on said shaft portion between said flight portion and said shaft bore,
   G. a window defined in said housing in circumferentially spaced relationship to said hopper in general alignment with said base and having a longitudinal width approximating the longitudinal width of said base relative to said channel,
   H. a block adapted for movements in said window towards and away from said feed screw radially thereof, the face of said block adjacent said feed screw being arcuately shaped to make general mating engagement with said flight portion when in contact therewith,
   I. spring means biasing said block towards yielding engagement with said flight portion,
   J. cam follower means associated with said block and adapted to engage a peripheral surface of said cam,
   K. said cam, said cam follower and said spring means coacting to move said block towards and away from said feed screw during rotational movements of said feed screw.

2. A food grinder comprising:
   A. a housing enclosing a generally cylindrical channel whose length is greater than its diameter, said housing defining at one end of said channel a shaft bore and at the other end thereof an aperture,
   B. a hopper associated with said housing whose mouth is adapted to open upwardly when said channel is horizontal and whose base radially interconnects with said channel adjacent one end thereof,
   C. a perforated plate demountably secured across said aperture.
   D. a feed screw in said channel and generally coaxial therewith, said screw having a flight portion and a shaft portion, said flight portion having a diameter approaching that of said channel, said shaft portion being journaled at opposite ends thereof in said perforated plate and in said shaft bore, respectively.
   E. drive means for said feed screw located exteriorly of said housing and connected with said shaft portion adjacent said shaft bore, and adapted to rotate said feed screw,
   F. a cam disc in said channel mounted on said shaft portion between said flight portion and said shaft bore, G. a window defined in said housing in circumferentially spaced relationship to said hopper in general alignment with said base and having a longitudinal width approximating the longitudinal width of said base relative to said channel, H. a block adapted for arcuate movements in said window about an axis longitudinally adjacent said feed screw's periphery radially of said channel towards and away from said feed screw, the face of said block adjacent said feed screw being arcuately shaped to make mating engagement with said flight portion when in contact therewith, I. hinge means including pin means associated with said housing, adjacent said window on the axis of said block and adapted to support said block for said arcuate movements thereof, J. spring means biasing said block yieldably away from said flight portion, and K. cam follower means associated with said block and adapted to engage a peripheral surface of said cam, L. said cam, said cam follower and said spring means coacting to move said block towards and away from said feed screw during rotational movements of said feed screw.

3. A food grinder comprising:

A. a housing enclosing a generally cylindrical channel whose length is greater than its diameter, said housing defining at one end of said channel a shaft bore and at the other end thereof an aperture, B. a hopper associated with said housing whose mouth is adapted to open upwardly when said channel is horizontal and whose base radially interconnects with said channel adjacent one end thereof, C. a perforated plate demountably secured across said aperture, D. a feed screw in said channel and generally coaxial therewith, said screw having a flight portion and a shaft portion, said flight portion having a diameter approaching that of said channel, said shaft portion being journaled at opposite ends thereof in said perforated plate and in said shaft bore, respectively, E. drive means for said feed screw located exteriorly of said housing and connected with said shaft portion adjacent said shaft bore, and adapted to rotate said feed screw, F. a cam disc in said channel eccentrically mounted on said shaft portion between said flight portion and said shaft bore, G. a block house having a blind bore therein, said house being associated with said housing, the longitudinal width of said bore approximating the longitudinal width of said base relative to said channel, said bore radially interconnecting with said channel in general alignment with said base but in circumferentially spaced relationship to said hopper, H. a block adapted for longitudinal sliding movements in said blind bore radially of said channels towards and away from said feed screw, the face of said block adjacent said feed screw being arcuately shaped to make mating engagement with said flight portion when in contact therewith, I. spring means within said block house adapted to bias said block towards yielding engagement with said flight portion, and J. cam follower means associated with said block and adapted to make continuous engagement with the periphery of said cam disc during rotational movements of said feed screw, coacting to move said block towards and away from said feed screw during said rotational movements, K. said cam disc, said cam follower means and said spring means coacting to move said block, towards and away from said feed screw during rotational movements of said feed screw.

* * * * *